United States Patent [19]

Summa et al.

[11] Patent Number: 5,632,206

[45] Date of Patent: May 27, 1997

[54] ADJUSTABLE CUSHIONED TOW BAR FOR POWER AND FREE CONVEYOR

[75] Inventors: Gareth D. Summa, Denver, Mo.; Michael L. Arnst, Kansas City, Kans.

[73] Assignee: Mid-West Conveyor Company, Inc., Kansas City, Kans.

[21] Appl. No.: 503,187

[22] Filed: Jul. 14, 1995

[51] Int. Cl.$^6$ .................................................. B61B 12/00
[52] U.S. Cl. ........................ 104/172.3; 213/7; 213/75 R; 188/268
[58] Field of Search ..................... 104/172.3, 172.4, 104/172.1; 213/75 R, 7, 1 R; 188/268; 267/201, 134, 175, 177

[56] References Cited

U.S. PATENT DOCUMENTS

| | | |
|---|---|---|
| 1,141,696 | 6/1915 | Fernanzo . |
| 1,294,467 | 2/1919 | Hovas . |
| 2,667,237 | 1/1954 | Rabinou . |
| 2,823,915 | 2/1958 | DeCarbon . |
| 3,044,416 | 7/1962 | Reibel et al. . |
| 3,053,526 | 9/1962 | Kendall . |
| 3,107,753 | 10/1963 | Georgette . |
| 3,110,367 | 11/1963 | Roberts . |
| 3,251,270 | 5/1966 | Seifried . |
| 3,361,084 | 1/1968 | Ellzey . |
| 3,371,442 | 3/1968 | Carlson .................................... 188/268 |
| 3,417,660 | 12/1968 | Harbrecht . |
| 3,478,698 | 11/1969 | Jones . |
| 3,720,172 | 3/1973 | Dehne . |
| 3,926,125 | 12/1975 | Ousu . |
| 3,938,625 | 2/1976 | Rodermocher et al. . |
| 4,011,929 | 3/1977 | Jeram . |
| 4,013,015 | 3/1977 | Fromme et al. . |
| 4,019,403 | 4/1977 | Kondo et al. . |
| 4,064,977 | 12/1977 | Taylor ...................................... 188/168 |
| 4,122,778 | 10/1978 | DiRosa . |
| 4,173,130 | 11/1979 | Sutliff et al. ............................ 188/268 |
| 4,251,064 | 2/1981 | Camilleri ................................ 188/268 |
| 4,771,700 | 9/1988 | Wakabayashi . |
| 5,027,715 | 7/1991 | Moore et al. ........................... 104/172.3 |
| 5,407,052 | 4/1995 | Heideman et al. ..................... 104/172.3 |

FOREIGN PATENT DOCUMENTS 757409  8/1980  U.S.S.R. .

*Primary Examiner*—Mark T. Le
*Attorney, Agent, or Firm*—Litman, McMahon and Brown, L.L.C.

[57] ABSTRACT

A cushioned tow bar for connecting a drive trolley to a load carriage in a power and free conveyor system includes a particulate shock absorber with a damping chamber which is partially filled with particulate material, such as small ball bearings, which act to dampen the movement of a piston through the damping chamber. The damping chamber comprises a portion of a sleeve which includes a threaded end cap which mates with threads on an open end of the sleeve. The threads in the sleeve extend along the longitudinal axis of the sleeve to an extent which allows the end cap to be threadably adjusted, changing the portion of the sleeve forming the damping chamber, and thus adjusting the cushioning effect of the tow bar.

8 Claims, 3 Drawing Sheets

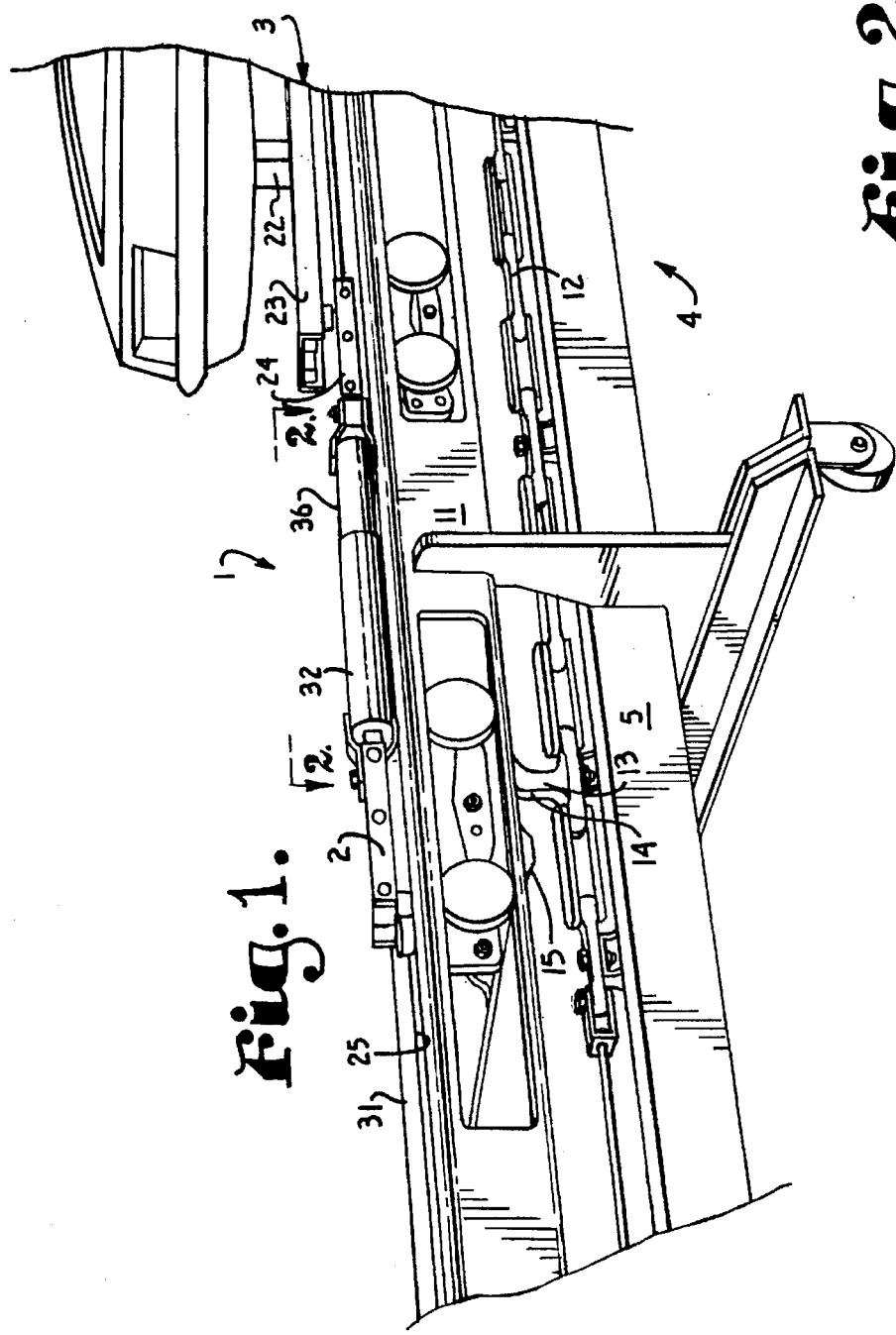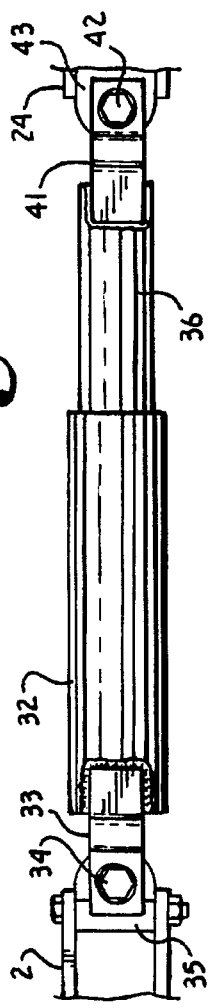

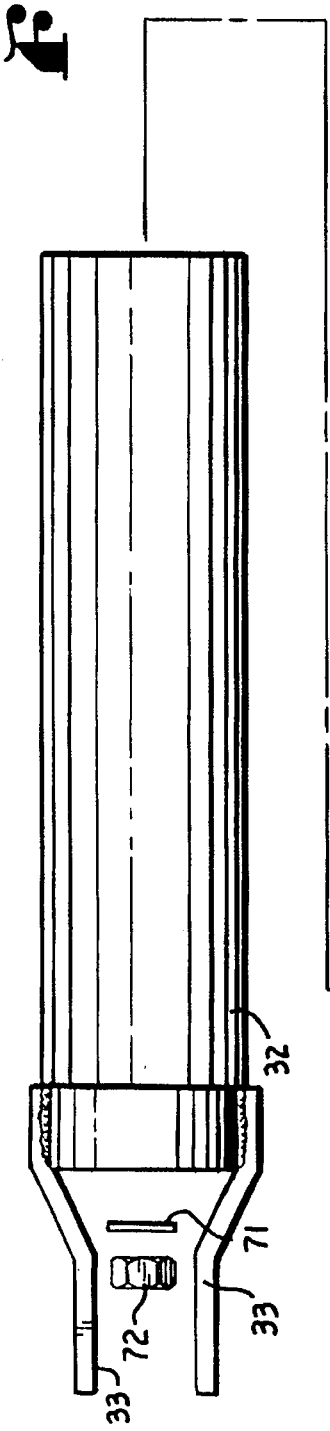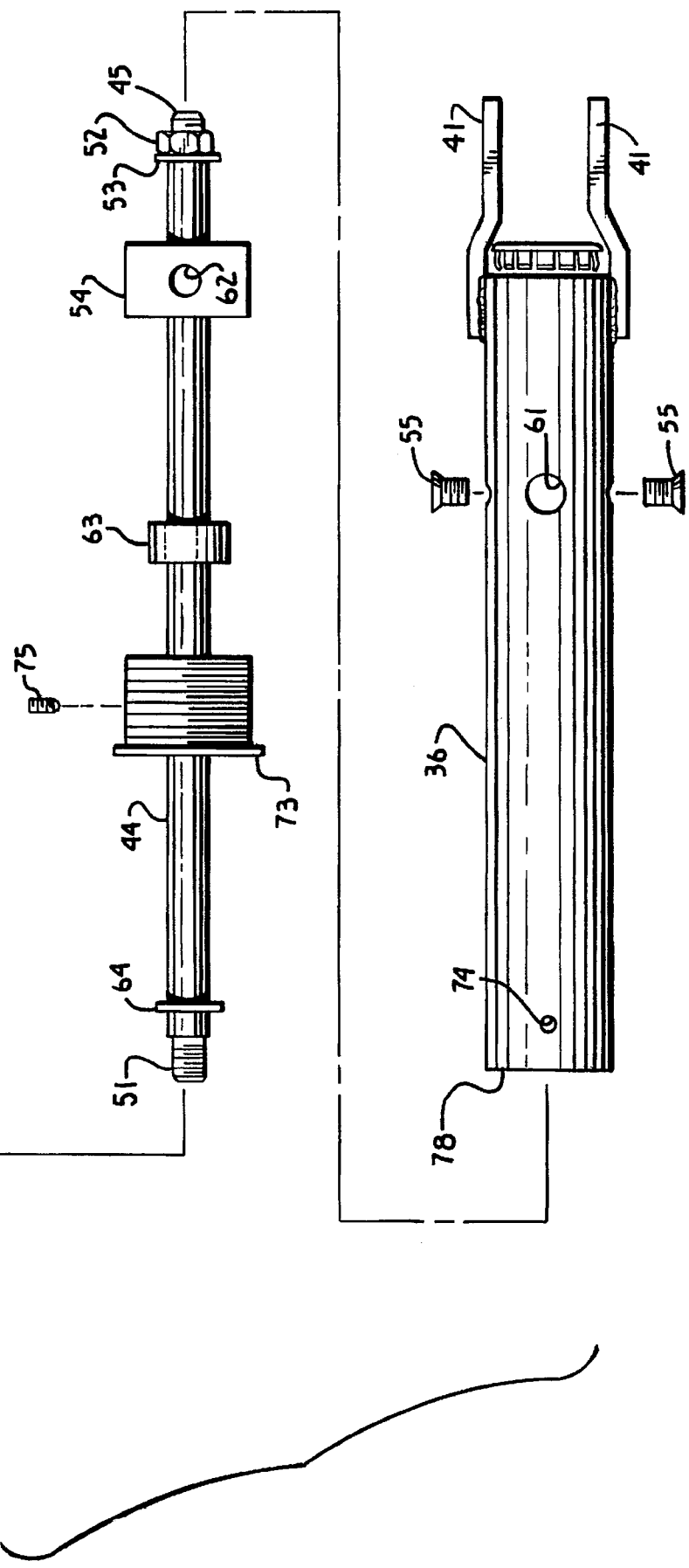
Fig. 3.

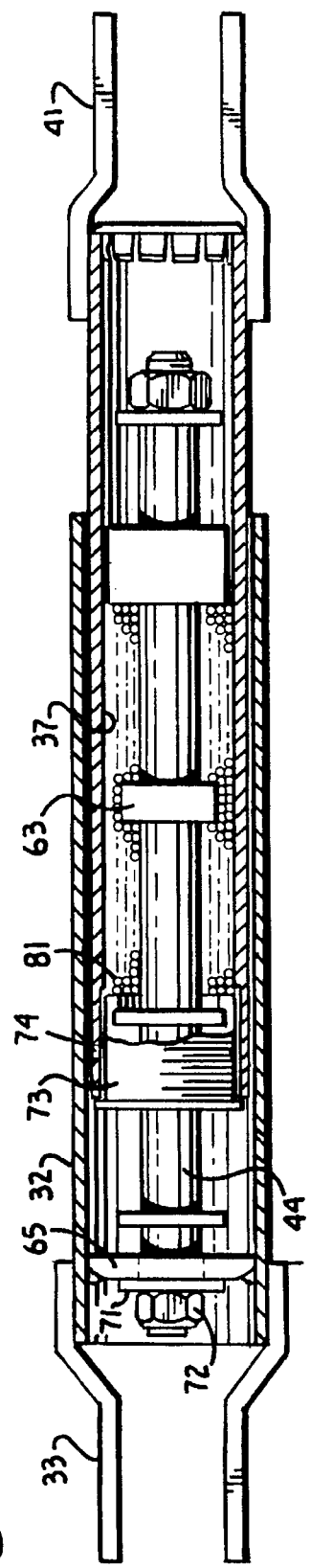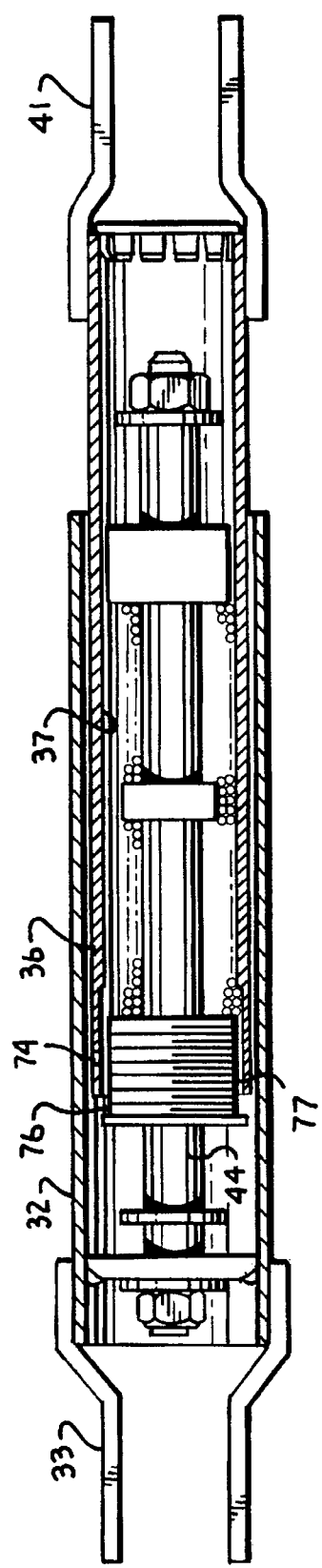

ADJUSTABLE CUSHIONED TOW BAR FOR POWER AND FREE CONVEYOR

FIELD OF THE INVENTION

The present invention relates to a cushioned tow bar for a power and free conveyor and more particularly to such a cushioned tow bar with a cushioning mechanism in which a piston moves through a damping chamber which is partially filled with a particulate damping material, such as a quantity of ball bearings. The damping chamber includes a threaded end cap and the size of the damping chamber, and thus the shock absorbing capability of the tow bar, is adjustable by turning the threaded cap.

BACKGROUND OF THE INVENTION

Power and free conveyor systems for moving bulky items through a manufacturing or assembly plant are well known. Such power and free conveyors include a "power" and a "free" conveyor track, generally disposed vertically with respect to each other. Operating within the power track is an endless drive chain with drive dogs periodically attached to the chain and extending toward the free track. These drive dogs are oriented to engage a trolley dog or actuator on a drive trolley operating within the free track. While the drive dogs are generally fixed in position relative to the drive chain, the trolley dogs on the drive trolleys are typically selectively retractable.

The free track generally follows the same path as the power track(s) but is spaced vertically relative thereto. As originally implemented, power and free conveyor systems were suspension systems with loads suspended from trolleys or carriers operating in the free track and with the power track disposed above the free track. These suspension systems have reached a high degree of sophistication and can include features such as the ability to stop and accumulate free trolleys in specific accumulating areas and transfer zones which include intersections where loads can be transferred between non-synchronous conveyor systems.

More recently, in response to the specific requirements of the automobile industry, floor mounted or "inverted" power and free systems have been developed. In these inverted systems, the power track and the free track are disposed beneath the floor of the factory, with the free track positioned above the power track. A plurality of load carriages are attached to the free trolleys through a slot in the factory floor. Each load carriage is usually attached to two or more load carrying trolleys with the load carriage being disposed above the floor and driven along the conveyor path by the associated load carrying trolleys.

These inverted systems have the capability of handling bulkier and heavier loads, such as automobile chassis, while minimizing many dangerous conditions found in suspension systems. For example, inverted systems allow workers to safely climb on and off of the load carriages and they eliminate the danger inherent in the swinging loads of suspension systems.

In such inverted power and free conveyors, the drive trolley is generally connected to the load carriage via a tow bar. The tow bar can be contained within the free track or it can be disposed above the surface of the factory floor. As a drive member or actuator on a drive trolley is engaged by a drive dog on the drive chain, the motion is abrupt, i.e. the drive trolley is jerked from a standing stop to the same speed as the drive chain in a split second. When the drive trolley is released, deceleration forces can be almost as strong. The drive trolleys are ruggedly designed so as to withstand these abrupt acceleration and deceleration forces. However, the acceleration and deceleration forces transmitted from the drive trolley to the load carrying trolleys via the tow bar can cause considerable stress and strain on the load carriages and the loads thereon.

It is well known to provide shock absorbing devices in power and free conveyor systems to dampen these abrupt acceleration and deceleration forces. While resilient bumpers and springs have been used, such devices, once compressed by a shock, tend to recover immediately, often setting up bouncing and vibration in the load. Thus, the more effective shock absorbing devices act to dampen the shock without setting up undesired bouncing or vibrations. Automotive type hydraulic or pneumatic shock absorbers have generally been the devices of choice. In such automotive-type shock absorbers, a piston operates within a damping chamber which includes a viscous fluid. The piston is connected to one end of the tow bar, for example, while the damping chamber is connected to the other end. Abrupt shocks are absorbed by forcing the viscous fluid through one or more orifices in the piston as it moves through the damping chamber.

Another shock absorbing mechanism, which is similar in concept to the automotive type shocks, uses a piston operating within a damping chamber which is partially filled with a particulate material, such as steel ball bearings or shot. Shocks are absorbed by the action of friction between the piston and the balls and between the balls themselves, as well as the effects of inertia on the balls. U.S. Pat. No. 5,027,715 to Archie S. Moore et al. (hereinafter the U.S. Pat. No. '715 patent), assigned to the present assignee, and which is herein incorporated by reference, teaches the use of such a particulate material shock absorbing device on a shock absorbing load carrier. In the U.S. Pat. No. '715 patent, the tow bar is eliminated by providing shock damping within the load carrier itself.

In power and free conveyor systems, the degree of damping required of a particular tow bar depends upon many factors, including the weight of the load carried, the speed of the drive chain in the power track, the track configuration, etc. In particulate shock absorbers such as the one taught by the U.S. Pat. No. '715 patent, the damping effect of the shock absorber is dependent upon many factors, including the relative diameters of the piston vs. the damping chamber, the size of the particulate material, i.e. the ball bearings, the relative coefficients of friction between the bearings and the piston and the chamber interior, and the number of bearings contained within the chamber, i.e. the degree to which the chamber is filled. Given a standard shock absorber configuration, of these variables, the one most readily changed is the percentage of fill of the chamber.

In shock absorbers such as that in the U.S. Pat. No. '715 patent, the size of the damping chamber is fixed, and thus the only way to change the percentage of fill is to disassemble the shock absorber and add or remove balls from the chamber. This is a complicated and labor intensive procedure which cannot readily be accomplished without taking the load carriage (or a tow bar incorporating such a shock absorber) out of service.

It is clear then, that a need exists for an improved design for a cushioned tow bar for a power and free conveyor transfer system which tow bar can be quickly and efficiently adjusted to provide selectively differing damping effects.

SUMMARY OF THE INVENTION

The present invention is directed to a cushioned tow bar for connecting a drive trolley to a load carriage in a power and free conveyor system. The tow bar includes a particulate shock absorber which is connected such that, as a drive dog in the conveyor power track engages the drive trolley, a piston connected to the drive trolley is pulled through an inner sleeve which is connected to the load carriage. A portion of the interior of the sleeve forms a damping chamber which is partially filled with particulate material, such as small ball bearings, which act to dampen the movement of the piston through the damping chamber. The sleeve includes a threaded end cap which mates with threads on an open end of the sleeve. The threads in the sleeve open end extend along the longitudinal axis of the sleeve to an extent which allows the end cap to be threadably adjusted, thus changing the effective volume of the sleeve which forms the damping chamber. The sleeve incorporates a number of set screw openings about its perimeter and extending through the threads for retaining the end cap in a selected threaded position such that the damping chamber volume can be selectively set to adjust the cushioning ability of the tow bar.

OBJECTS AND ADVANTAGES OF THE INVENTION

The principal objects of the present invention are: to provide an improved cushioned tow bar for connecting a drive trolley to a load carriage in a power and free conveyor transfer system; to provide such a cushioned tow bar which includes a particulate shock absorber; to provide such a cushioned tow bar in which the particulate shock absorber has an inner sleeve forming a damping chamber with a volume which is selectively adjustable; to provide such a cushioned tow bar in which the adjustment of the damping chamber volume is accomplished via a threaded inner sleeve end cap; to provide such a cushioned tow bar in which the sleeve incorporates set screws for retaining the end cap in a selected position on the sleeve; to provide such a cushioned tow bar which is easily and efficiently adjustable to provide for selective cushioning properties; and to provide such a cushioned tow bar which is economical to manufacture and install and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a portion of a power and free conveyor system illustrating a cushioned tow bar in accordance with the present invention connecting a drive trolley with a load carriage.

FIG. 2 is a fragmentary, enlarged, top plan view of the cushioned tow bar, taken along line 2—2 of FIG. 1.

FIG. 3 is an exploded view of the cushioned tow bar of FIG. 2, illustrating a damping chamber in an inner sleeve, a piston rod with an enlarged cylindrical disc piston portion, a threaded end cap for selectively adjusting the volume of the damping chamber, and an outer sleeve.

FIG. 4 is a cross-sectional view of the cushioned tow bar, taken along line 4—4 of FIG. 2, and illustrating the end cap in a first position which provides minimum damping chamber volume, and thus maximum cushioning effect.

FIG. 5 is a cross-sectional view of the cushioned tow bar, taken along line 4—4 of FIG. 2, and illustrating the end cap in a second position which provides greater damping chamber volume, and thus less cushioning effect than in the position of FIG. 4.

DETAILED DESCRIPTION OF THE INVENTION

As required, detailed embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to FIG. 1, the reference numeral 1 generally indicates a cushioned tow bar connecting a drive trolley 2 to a load carriage 3 in a power and free conveyor system, generally indicated as 4. The illustrated conveyor system 4 is of the inverted type in which a power track 5 is positioned beneath and vertically aligned with a free track 11. An endless drive chain 12 is positioned within the power track 5 and a plurality of drive dogs 13 are attached to the chain 12 at periodic intervals and extend upward therefrom toward the free track 11. Each drive dog 13 includes a pushing face 14 for selectively engaging a drive member 15 in the drive trolley 2 operating within the free track 11.

FIG. 1 illustrates a typical arrangement for conveying automobile bodies, such as the body 21, through an automobile assembly plant. The body 21 is shown attached to the load carriage 3 via a plurality of support members 22, only one of which is illustrated. The carrier 3 includes a platform 23 to the bottom of which are attached a pair of load carrying trolleys 24 of which the frontmost trolley 24 is shown. Each load carrying trolley 24 includes a wheeled carriage 25 operating within the free track 11 and each trolley 24 extends through a slot 30 in a factory floor 31.

As one of the drive dogs 13 on the drive chain 12 engages the pusher member 15 on the drive trolley 2, the drive trolley 2 is abruptly moved from a standstill to a speed equal to the speed of the drive chain 12, which can be 5 MPH or even greater. This virtually instantaneous acceleration places considerable strain on the drive trolley 2, but the drive trolley 2 is ruggedly constructed in order to withstand such shocks. More importantly, as illustrated by FIG. 1, the abrupt acceleration is also translated to the load carriage 3 and the load, such as the body 21 carried thereon, via the tow bar 1. If no cushioning effect were provided by the tow bar 1, the shock translation would be almost instantaneous, and such abrupt shocks to the load carriage 3 can damage or upset the load 21. Furthermore, for differing load conditions, conveyor track configurations, and drive chain speeds, differing degrees of cushioning are required. Thus, the inventive tow bar 1 is designed to be readily adjustable, as illustrated in FIGS. 2-5, and as described below.

FIGS. 2-5 illustrate the adjustable tow bar 1 in greater detail. The tow bar 1 includes an outer cylindrical sleeve 32 with a pair of opposed mounting brackets 33 welded or otherwise rigidly attached thereto. The brackets 33 include a bore (not shown) through which a bolt 34 extends to attach the outer sleeve 32 to the drive trolley 2 via a bracket 35. The outer sleeve 32 is of a first diameter. An inner cylindrical sleeve 36 fits telescopically within the outer sleeve 32 and an interior portion of the inner sleeve 36 forms a damping chamber 37. A second pair of brackets 41 are rigidly attached to either side of the inner sleeve 36 and the brackets 41 each include a bore (not shown) through which a bolt 42 extends to attach the damping chamber 37 to the frontmost load carrying trolley 24 via a bracket 43.

Referring to FIG. 3, an elongate piston rod 44 has a first threaded end 45 and a second threaded end 51. A nut 52 is threaded onto the first end 45 as a keeper for a washer 53. The washer 53 is sized to prevent the first rod end 45 from being pulled entirely through a bushing 54. The bushing 54 includes a central bore (not shown) of a diameter slightly larger than the outside diameter of the rod 44 to accommodate the movement of the rod through the bushing 54. The outside diameter of the bushing 54 is slightly less than the inside diameter of the inner sleeve 36. The bushing 54 is positioned within and attached to the inner sleeve 36 via a plurality of set screws 55 extending through counter-sunk openings 61 in the inner sleeve 36 and extending into corresponding threaded openings 62 extending radially into the bushing 54. A piston disc 63 is rigidly attached about the piston rod 44 at a position intermediate the threaded ends 45 and 51. A keeper 64 is attached to and extends around the rod 44 proximate the second threaded end 51 and the second threaded end 51 of the rod 44 extends through an opening (not shown) in a plate 65 welded within the interior of the outer sleeve 32. A washer 71 is placed proximate the plate 65 and a nut 72 is threaded onto the first threaded end 45 to affix the piston rod 44 to the outer sleeve 32.

A threaded end cap 73 includes a central bore (not shown) which also has a diameter slightly greater than the outside diameter of the rod 44 to allow the rod 44 to move back and forth through the end cap 73. The inner sleeve 36 has a number of threaded bores 74 radially positioned thereabout for receiving set screws 75 which extend through the bores 76 in the inner sleeve 36 to contact the end cap 73 (FIGS. 4 and 5). The end cap 73 has male threads 76 which mate with receiving female threads 77 in an open end 78 of the inner sleeve 36.

A large number of ball bearings 81 are placed within the damping chamber 37 to provide a friction damping for the piston rod 44 and particularly for the disc 63 as it moves through the damping chamber 37. The damping effect of the ball bearings 81 comes from friction between the bearings 81 and the disc 63, as well as friction between the bearings 81 and the rod 44, the interior walls of the damping chamber 37 and the friction between the balls 81 themselves. The damping force provided by the bearings 81 is proportionate to the degree to which the bearings 81 fill the interior of the damping chamber 37, i.e. the greater the percentage of the damping chamber 37 which is filled with balls 81, the greater the damping force of the tow bar 2.

The inventive tow bar 2 is designed such that the effective volume of the damping chamber 37, i.e. the interior space within the inner sleeve 36 which is available for filling with balls 81, is readily adjustable. In order to adjust the damping force provided by the tow bar 2, it is necessary for the outer sleeve 32 to be removed from the tow bar 2, a simple task which can be quickly accomplished by removing the nut 72 and simply pulling the outer sleeve 32 free of the piston rod 44 and the inner sleeve 36. The set screws 75 are then loosened and the threaded end cap 73 is turned, either clockwise to reduce the volume of the chamber 37, or counter clockwise to expand the size of the chamber 37. The set screws 75 are then retightened and the outer sleeve 32 reattached by replacing the nut 72.

FIG. 4 illustrates a position of the end cap 73 at which the volume of the damping chamber 36 is minimized. In this position, the balls 81 substantially fill the volume of the chamber 37, thus maximizing friction on the disc 63 and the rod 44 as it moves through the chamber 37. This provides a maximum damping force, and thus maximum cushioning effect for the tow bar 2.

FIG. 5 illustrates a position of the end cap 73 which expands the volume of the damping chamber 37 such that the percentage of the chamber which is filled by the balls 81 is decreased. Thus, the friction on the disc 63 and the rod 44 by the balls 81 is lessened, which, in turn, lessens the cushioning effect of the tow bar 2.

The invention has been illustrated and described with a threaded end cap 73 which is adjustable to vary the volume of the damping chamber 36. It should be noted that the end cap 73 could be replaced with any other suitable adjustment for varying the volume of the damping chamber 37. For example, an alternative adjustable end cap can be formed by using a plug with an expandable and contractable outside diameter which is adjustable via an internal threaded rod, as is found on some boat drain plugs. The volume of the chamber 37 could also be expanded or contracted by providing a plurality of sets of counter-sunk bores 61 in the wall of the inner sleeve 36 such that the bushing 54 can be moved back and forth within the inner sleeve 36. Furthermore, while the inventive cushioning system has been illustrated and described as a tow bar, the same adjustable shock absorber could be used on a self contained drive trolley and load carriage, as taught by the U.S. Pat. No. '715 patent.

The inventive tow bar 2 has been illustrated and described as being of use with an inverted power and free conveyor but it could readily be adapted to a conventional power and free system in which the power track is disposed vertically above the free track. In such a system, the drive trolley design would, of course, be inverted from the orientation illustrated herein.

It is thus to be understood that while certain forms of the present invention have been illustrated and described herein, it is not to be limited to the specific forms or arrangement of parts described and shown.

What is claimed and desired to be secured by Letters Patent is as follows:

1. A cushioned connector connecting a load carrying member in a power and free conveyor system to a driving member, said connector comprising:

a. a damping chamber connected to either said load carrying member or said driving member, said damping chamber comprising a sleeve open at one end and provided with threads;

b. a piston movable within said damping chamber, said piston being connected to the other of said load carrying member or said driving member;

c. a plurality of ball bearings at least partially filling said damping chamber;

d. adjustment means for adjusting the volume of said damping chamber to thereby adjust the percentage of said damping chamber which is filled by said ball bearings, said adjustment means comprising an end cap with threads which mate with the threads in said sleeve such that said end cap is adjustable within said sleeve by rotating said end cap relative to said sleeve;

e. at least one set screw bore extending radially into said sleeve proximate said open end; and f. at least one set screw extending through said set screw bore and selectively engaging said end cap to thereby retain said end cap in a selected rotation position within said sleeve.

2. A cushioned tow bar connecting a load carrying member in a power and free conveyor system to a driving trolley, said tow bar comprising:

a. a sleeve open at one end, a portion of the interior space of said sleeve forming a damping chamber, said sleeve being connected to either said load carrying member or said driving trolley;

b. a piston movable within said sleeve and damping chamber, said piston being connected to the other of said load carrying member or said driving trolley;

c. an incompressible particulate damping material at least partially filling said damping chamber;

d. a threaded end cap positioned in covering relationship with said sleeve open end and being movable relative to said sleeve for adjusting the portion of said sleeve which forms said damping chamber to thereby adjust the percentage of said damping chamber which is filled by said particulate damping material and thus the cushioning effect of said tow bar; and e. retaining means, said retaining means having a first position for retaining said end cap in a particular rotation position within said sleeve open end and a second position for allowing said end cap to be selectively rotated relative to said sleeve.

3. A cushioned tow bar as in claim 2, wherein said particulate material comprises ball bearings.

4. A cushioned tow bar as in claim 2, wherein:

a. said sleeve comprises a cylinder and said open end includes threads; and b. said end cap comprises threads which engage said open end threads, said end cap being movable relative to said sleeve by selectively rotating said end cap within said sleeve open end.

5. A cushioned tow bar as in claim 4, wherein:

a. said retaining means comprises:

i. at least one set screw bore extending radially into said sleeve proximate said open end; and ii. at least one set screw extending through said set screw bore and selectively engaging said end cap in said particular rotation position within said sleeve.

6. A method of adjusting the cushioning capacity of a cushioned tow bar, said tow bar being connected between a load carrying member and a driving trolley in a power and free conveyor system, said tow bar comprising an inner sleeve, a portion of the interior space of said inner sleeve forming a damping chamber, said inner sleeve being connected to either said load carrying member or said driving trolley; a piston moveable within said inner sleeve and damping chamber, said piston being connected to the other of said load carrying member or said driving trolley; incompressible particulate damping material at least partially filling said damping chamber; and an end cap threadably engaged with an open end of said inner sleeve and including a retaining means, the retaining means having a first position for retaining said end cap in a particular rotation position within said sleeve open end and a second position for allowing said end cap to be selectively rotated relative to said sleeve, said method comprising the steps of:

a. moving said retaining means from said first position to said second position;

b. selectively rotating said end cap within said inner sleeve open end to a selected position relative to said inner sleeve to adjust the portion of said inner sleeve which forms said damping chamber to thereby adjust the percentage of said damping chamber which is filled by said incompressible particulate damping material; and c. moving said retaining means from said second position to said first position to thereby retain said end cap in said selected position.

7. A method as in claim 6, wherein said retaining means comprises at least one set screw bore extending radially into said inner sleeve proximate said open end and at least one set screw extending through said bore to selectively engage said end cap to retain said end cap in a selected position within said inner sleeve, wherein:

a. said step of moving said retaining means from said first position to said second position includes loosening said set screw; and a. said step of moving said retaining means from said second position to said first position includes tightening said set screw.

8. A method as in claim 6, wherein said tow bar further comprises an outer sleeve connected to the other of said load carrying member or said driving trolley, said outer sleeve fitting telescopically over said inner sleeve, said piston extending through an opening in said end cap and being connected to said outer sleeve via a removable securing means, said method further comprising the steps of:

a. removing said outer sleeve from said piston by removing said removable securing means to thereby gain access to said end cap and said retaining means.

\* \* \* \* \*